(12) United States Patent
Gao et al.

(10) Patent No.: US 10,322,696 B2
(45) Date of Patent: Jun. 18, 2019

(54) VEHICLE ENVIRONMENT IMAGING SYSTEMS AND METHODS

(71) Applicant: GM GLOBAL TECHNOLOGY OPERATIONS LLC, Detroit, MI (US)

(72) Inventors: Xiujie Gao, Troy, MI (US); Jinsong Wang, Troy, MI (US); Wende Zhang, Troy, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 241 days.

(21) Appl. No.: 15/409,022

(22) Filed: Jan. 18, 2017

(65) Prior Publication Data

US 2018/0201227 A1 Jul. 19, 2018

(51) Int. Cl.
*H04N 7/18* (2006.01)
*B60R 25/30* (2013.01)

(52) U.S. Cl.
CPC .................................. *B60R 25/305* (2013.01)

(58) Field of Classification Search
CPC .................................................... B60R 25/305
USPC ......................................................... 348/148
See application file for complete search history.

(56) References Cited

U.S. PATENT DOCUMENTS

| | | | |
|---|---|---|---|
| 8,791,836 B2 | 7/2014 | Herman | |
| 9,437,111 B2 | 9/2016 | Ignaczak et al. | |
| 2002/0003378 A1 | 1/2002 | Marcus et al. | |
| 2007/0189728 A1* | 8/2007 | Yu | H04N 5/232 386/226 |
| 2007/0268067 A1 | 11/2007 | Bernhard et al. | |
| 2008/0133136 A1* | 6/2008 | Breed | B60N 2/2863 701/301 |
| 2010/0289631 A1 | 11/2010 | Rao et al. | |
| 2013/0086111 A1* | 4/2013 | Schoettle | G06F 17/30545 707/776 |
| 2014/0058586 A1* | 2/2014 | Kalhous | B60R 25/24 701/2 |
| 2014/0180959 A1* | 6/2014 | Gillen | G06Q 10/0838 705/341 |
| 2015/0287326 A1 | 10/2015 | Weller | |
| 2015/0307025 A1 | 10/2015 | Hedley | |

(Continued)

OTHER PUBLICATIONS

Chong Sun et al. (2013) A Rear View Camera Based Tailgate Warning System. In: SAE-China, FISITA (eds) Proceedings of the FISITA 2012 World Automotive Congress. Lecture Notes in Electrical Engineering, vol. 197. Springer, Berlin, Heidelberg.

(Continued)

*Primary Examiner* — Allen C Wong
(74) *Attorney, Agent, or Firm* — Quinn IP Law

(57) ABSTRACT

A vehicle includes at least one imaging device configured to generate image data indicative of a vicinity of the vehicle. The vehicle also includes a user interface display configured to display image data from the at least one imaging device. A vehicle controller is programmed to monitor image data for the presence of moving external objects within the vicinity, and to activate the user interface display to display image data in response to detecting a moving external object in the vicinity while the vehicle is at a rest condition. The controller is also programmed to assign a threat assessment value based on conditions in the vicinity of the vehicle, and upload image data to an off-board server in response to the threat assessment value being greater than a first threshold.

16 Claims, 3 Drawing Sheets

(56) References Cited

U.S. PATENT DOCUMENTS

| | | |
|---|---|---|
| 2016/0088147 A1* | 3/2016 | Silver .............. H04M 1/72577 |
| | | 706/14 |
| 2016/0119539 A1* | 4/2016 | Tan .......................... B60R 1/00 |
| | | 348/148 |
| 2016/0347149 A1 | 12/2016 | Rustoni |
| 2017/0113512 A1 | 4/2017 | Park et al. |
| 2017/0120803 A1* | 5/2017 | Kentley ................... B60Q 1/26 |
| 2018/0229587 A1 | 8/2018 | Gao et al. |

OTHER PUBLICATIONS

D. Balcones et al. (2009) Real-Time Vision-Based Vehicle Detection for Rear-End Collision Mitigation Systems, pp. 320-325.

\* cited by examiner

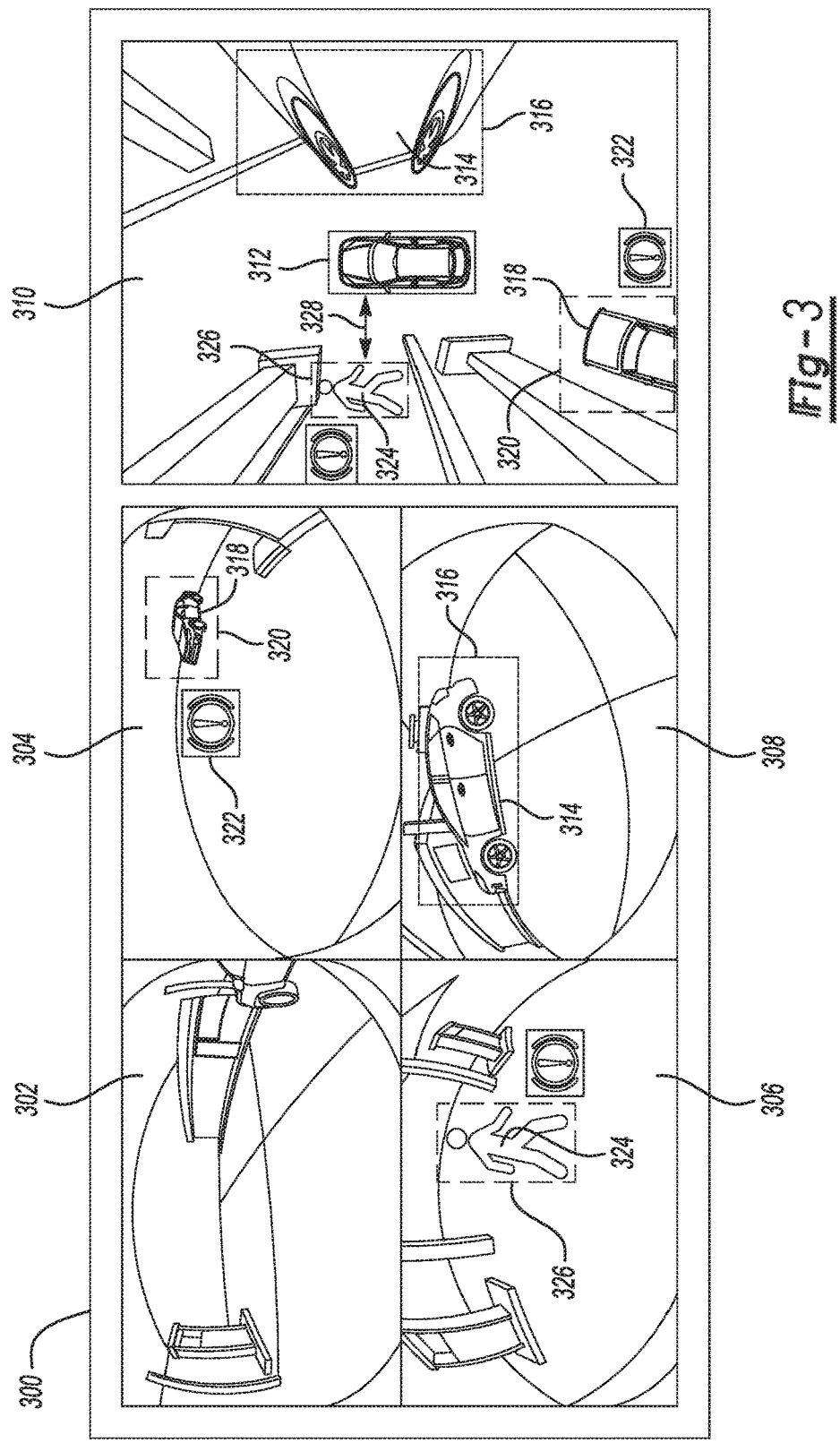

VEHICLE ENVIRONMENT IMAGING SYSTEMS AND METHODS

TECHNICAL FIELD

The present disclosure relates to vehicle imaging systems and methods for providing vehicle security enhancement.

INTRODUCTION

Vehicles encounter situations and locations which carry various levels of risk due to crime, traffic and other variables of the external environment of the vehicle. For example, passengers may perform tasks such as commercial transactions in the vehicle. Performance of such tasks can also serve as a distraction such that a passenger is less aware of the vehicle surroundings. Further, passengers, even when fully alert, may be unaware of increased risks and therefore not perceive nearby actual threats. Staying fully aware of the vehicle surroundings in addition to considering varying risk in a given situation may be difficult for a passenger to do on a consistent basis, particularly when performing unrelated tasks.

SUMMARY

A vehicle includes at least one imaging device configured to generate image data indicative of a vicinity of the vehicle. The vehicle also includes a user interface display configured to display image data from the at least one imaging device. A vehicle controller is programmed to monitor image data for the presence of moving external objects within the vicinity, and to activate the user interface display to display image data in response to detecting a moving external object in the vicinity while the vehicle is at a rest condition. The controller is also programmed to assign a threat assessment value based on conditions in the vicinity of the vehicle, and upload image data to an off-board server in response to the threat assessment value being greater than a first threshold.

A method of surveilling a vicinity of a host vehicle having sensors and a processor includes receiving location-based threat information indicative of a threat risk, and activating at least one sensor to monitor a vicinity of the host vehicle while the vehicle is at a rest condition. The method also includes assigning a threat assessment value based on a current location of the host vehicle relative to the location-based threat information and a condition of the vicinity. The method further includes issuing a command for a response action in response to the threat assessment value being greater than a predetermined threshold.

A vehicle includes at least one sensor configured to monitor a condition of a vicinity of the vehicle. The vehicle also includes a user interface display configured to display image data depicting output from the at least one sensor. A controller is programmed to display an image depicting the vicinity in response to receiving sensor data indicative of an approaching object while the host vehicle is at a rest condition. The controller is also programmed to assign a threat assessment value based on at least one of a rate of approaching speed of the approaching object, and a distance between the vehicle and the approaching object.

BRIEF DESCRIPTION OF THE DRAWINGS

FIG. 3 is a user display interface including vehicle vicinity surveillance images.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
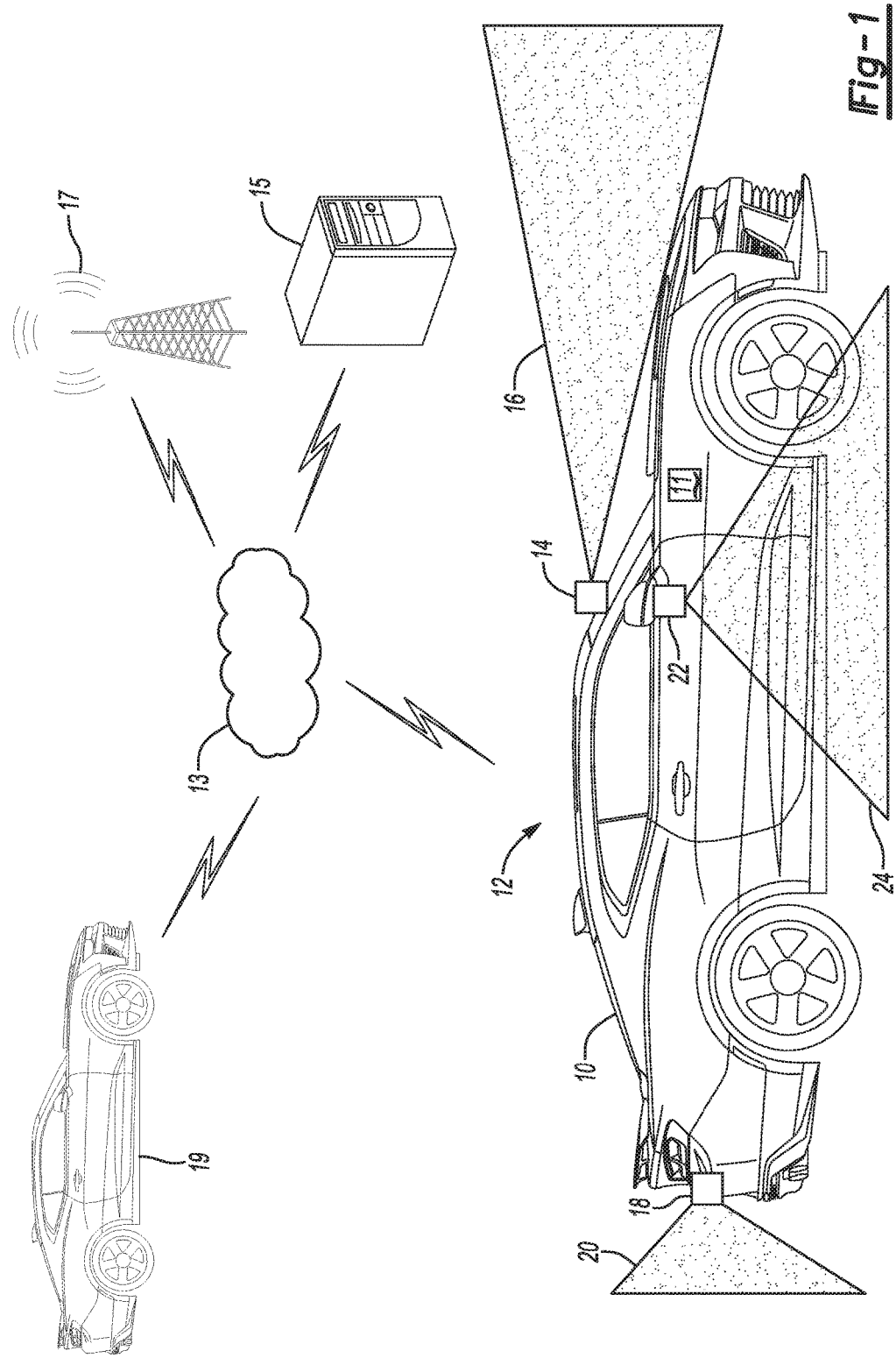
FIG. 1 is a side view of a vehicle having a vision system.

Referring to FIG. 1, a vehicle 10 includes a vision system 12 configured to capture images in a plurality of regions surrounding the vehicle, including, but not limited to, images in a forward-facing direction, a rearward-facing direction, and/or images in lateral-facing directions. The vision system 12 includes at least one vision-based imaging device to captures images corresponding to the exterior of the vehicle 10 for detecting the vehicle surroundings. Each of the vision-based imaging devices is mounted on the vehicle so that images in the desired region of the vehicle vicinity are captured.

A first vision-based imaging device 14 is mounted behind the front windshield for capturing images representing the vehicle's vicinity in an exterior forward direction. In the example of FIG. 1, the first vision-based imaging device 14 is a front-view camera for capturing a forward field-of-view (FOV) 16 of the vehicle 10. In additional examples, an imaging device may be disposed near a vehicle grill, a front fascia, or other location closer to the forward edged of the vehicle. A second vision-based imaging device 18 is mounted at a rear portion of the vehicle to capture images representing the vehicle's vicinity in an exterior rearward direction. According to an example, the second vision-based imaging device 18 is a rear-view camera for capturing a rearward FOV 20 of the vehicle. A third vision-based imaging device 22 is mounted at a side portion of the vehicle to capture images representing the vehicle's vicinity in an exterior lateral direction. According to an example, the third vision-based imaging device 22 is a side-view camera for capturing a lateral FOV 24 of the vehicle. In a more specific example, a side-view camera is mounted on each of opposing sides of the vehicle 10 (e.g. a left side-view camera and a right side-view camera). It should be appreciated that while various FOV's are depicted in the Figures as having certain geometric patterns, actual FOV's may have any number of different geometries according to the type of imaging device which is employed in practice. In some examples, wide angle imaging devices are used to provide wide angle FOV's such as 180 degrees and wider. Additionally, while each of the cameras is depicted as being mounted on the vehicle, alternate examples include external cameras having FOV's which capture the surrounding environment of the vehicle.

The cameras 14, 18, and 22 can be any type of imaging device suitable for the purposes described herein, that are capable of receiving light, or other radiation, and converting the light energy to electrical signals in a pixel format using, for example, charged coupled devices (CCD). Each of the cameras may also be operable to capture images in various regions of the electromagnetic spectrum, including infrared, ultraviolet, or within visible light. The cameras may also be operable to capture digital images and/or video data in any suitable resolution including high-definition. As used in the present disclosure, image data provided by the image capture devices includes either individual images or a stream of video images. The cameras may be any digital video recording device in communication with a processing unit of the vehicle. Image data acquired by the cameras is passed to the vehicle processor for subsequent actions. For example, image data from the cameras 14, 18, and 22 is sent to a processor, or vehicle controller 11, which processes the image data. In the case of external cameras, image data may be wirelessly transmitted to the vehicle controller 11 for use as described in any of the various examples of the present disclosure. As discussed in more detail below, the vehicle processor 11 may be programmed to generate images and other graphics at a user display such as, for example, a console screen or at a review mirror display device.

The various vision system components discussed herein may have one or more associated controllers to control and monitor operation. The vehicle controller 11, although schematically depicted as a single controller, may be implemented as one controller, or as system of controllers in cooperation to collectively manage the vision system and other vehicle subsystems. Communication between multiple controllers, and communication between controllers, actuators and/or sensors may be accomplished using a direct wired link, a networked communications bus link, a wireless link, a serial peripheral interface bus or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. In a specific example, multiple controllers communicate with one another via a serial bus (e.g., Controller Area Network (CAN)) or via discrete conductors. The controller 11 includes one or more digital computers each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 11 may also store a number of algorithms or computer executable instructions in non-transient memory that are needed to issue commands to perform actions according to the present disclosure. In some examples algorithms are provided from an external source such as a remote server 15.

The controller 11 is programmed to monitor and coordinate operation of the various vision system components. The controller 11 is in communication with each of the image capturing devices to receive images representing the vicinity and may store the images as necessary to execute vehicle security enhancement algorithms described in more detail below. The controller 11 is also in communication with a user display in an interior portion of the vehicle 10. The controller is programmed to selectively provide pertinent images to the display to inform passengers about conditions in the vicinity of the vehicle 10. While image capturing devices are described by way of example in reference to the vision system, it should be appreciated that the controller 11 may also be in communication with an array of various sensors to detect external objects and the overall environment of the vehicle. For example, the controller may receive signals from any combination of radar sensors, lidar sensors, infrared sensors, ultrasonic sensors, or other similar types of sensors in conjunction with receiving image data. The collection of data signals output from the various sensors may be fused to generate a more comprehensive perception of the vehicle environment, including detection and tracking of external objects.

The controller 11 may also be capable of wireless communication using an internal transceiver. The transceiver may be configured to exchange signals with a number of off-board components or systems. The controller 11 is programmed to exchange information using a wireless communications network 13. Data may be exchanged with a remote server 15 which may be used to reduce on-board data processing and data storage requirements. In at least one example, the server 15 performs processing related to image processing and analysis. The server may store one or more model-based computation algorithms to perform vehicle security enhancement functions. The controller 11 may further be in communication with a cellular network 17 or satellite to obtain a global positioning system (GPS) location. The controller 11 may also be in direct wireless communication with objects in a vicinity of the vehicle 10. For example, the controller may exchange signals with various external infrastructure devices (i.e., vehicle-to-infrastructure, or V2I communications) and/or a nearby vehicle 19 to provide data acquired from the vision system 12, or receive supplemental image data to further inform the user about the vehicle environment.

The vision system 12 may be used for recognition of road markings, lane markings, road signs, or other roadway objects for inputs to lane departure warning systems and/or clear path detection systems. Identification of road conditions and nearby objects may be provided to the vehicle processor to guide autonomous vehicle guidance. Images captured by the vision system 12 may also be used to distinguish between a daytime lighting condition and a nighttime lighting condition. Identification of the daylight condition may be used in vehicle applications which actuate or switch operating modes based on the sensed lighting condition. As a result, the determination of the lighting condition eliminates the requirement of a dedicated light sensing device while utilizing existing vehicle equipment. In one example, the vehicle processor utilizes at least one captured scene from the vision system 12 for detecting lighting conditions of the captured scene, which is then used to adjust a dimming function of one or more image displays such as at a rearview mirror or other external view displays. In addition to the above-describe functions of the vision system, aspects of the present disclosure include parking enhancement to improve accuracy of vehicle positioning within a known parking location.

According to aspects of the present disclosure, images captured by the vision system 12 are used to enhance vehicle arrival to and/or departure from a known location. More specifically, the vision system 12 may be use to prevent vehicle damage due to contact with objects near a parking location by providing sensor-based route guidance to select a vehicle path. In one example, portions of a security enhancement algorithm conditionally render one or more external camera views to the driver. In a more specific example, the security enhancement algorithm may be used in combination with camera image pattern storing and comparison to provide advanced warnings and other actions in response to detection of one or more threats.

According to aspects of the present disclosure, the vehicle controller 11 may be programmed to enhance the security of vehicle passengers using data acquired by the vision system 12. Some examples include allowing the driver to engage a diligence mode in response to a user input. Diligence mode as used in the present disclosure may include algorithms which actively probe the vehicle vicinity for visible threats. Such an on-demand detection mode may allow a user to determine when the vehicle actively probes for security as opposed to conventional vision applications. According to a specific example, during situations where the driver feels subjectively uncomfortable, they may provide user input to engage the vehicle diligence mode to actively surveille the vicinity near the host vehicle to enhance user comfort. The vehicle user display may be used to provide additional FOV information to increase driver assurance with respect to the conditions of the vehicle surroundings. Discussed in more detail below, the user display may be configure to provide a more comprehensive view for the driver compared to what would have otherwise been available using only rearview mirrors.

According to some examples, the vehicle may automatically enter the diligence mode based on the contextual situation of the vehicle. The degree of surveillance, subsequent data output, and vehicle response actions may all be progressively increased based on a risk score or threat assessment value which is calculated at the controller. That is, any of a range of vehicle responses and alerts may be provided based on the perceived urgency of the detected threat. There may be a set of progressive threat assessment score thresholds corresponding to increasing threat levels. The various different vehicle responses may be based on an assessment of the perceived object's status along a continuum of states indicating the threat status of the object.

In other examples, geographical location information may be used as a basis to vary the sensitivity of visual detection performed by the vision system when at high-risk locations. More specifically, the diligence mode algorithm may include a crime risk assessment value based on statistical crime data associated with a given geographic location. Thus in known high-crime locations, the vehicle may more actively surveille its surroundings as compared to lesser-crime areas. In further examples, there may be a lower threshold of a vehicle response to detection of objects near the vehicle while the crime risk assessment is larger. Additionally, certain vehicle usages known to more frequently be crime targets may increase the crime risk score determination. For example, while the vehicle is located at a commerce location, such as an automatic bank teller machine (ATM) or other banking drive-up locations, service drive-through locations, fuel station, or other situations where a driver may conduct financial transactions from the vehicle, the diligence mode may be engaged to actively probe the surroundings for perceived threats. According to aspects of the present disclosure, the vehicle controller may be programmed to use location-based information as a basis to enhance security by increasing object detection sensitivity when the vehicle is at a commerce location.

In additional examples, the time of day may be incorporated into the determination of the threat assessment value. For example, nighttime hours may carry a greater likelihood of crime approaching the vehicle as compared to a threat assessment value calculated during daylight hours. According to aspects of the present disclosure, the vehicle controller may be programmed to use time of day as a basis to enhance security by increasing weighting of the threat assessment value during nighttime hours.

In further examples, light detection may be an additional input to the threat assessment algorithm. Specifically, data output from a light sensor may be used to apply weighting based on the light level in the area near the vehicle. In this case, where more dark areas are present near the vehicle, the diligence mode may be automatically engaged to monitor for threats emerging from the dark areas. In contrast, more well-lit areas (even at night time) may mitigate an increase in the threat assessment value for nighttime situations. As discussed above, the image capture devices themselves may be effectively used for light level detection by analyzing a light level of the image data acquired by the devices.

Once an external object is detected by the vision system, the particular movement of the object may be indicative of the degree of a potential threat. For example, the controller may be programmed to use speed of a moving external object as an input to the threat assessment algorithm. In addition, the particular trajectory of the object relative to the vehicle position, as well as the proximity of the moving external object each may be inputs to the threat assessment algorithm. In a specific example, the controller is programmed to use each of speed, trajectory, and proximity of a moving external object to calculate a time of arrival at the vehicle. In this way, the controller may cause a proactive response action of the vehicle prior to the approaching object arriving at the vehicle. Similarly, external objects which carry a trajectory directed away from the vehicle may correspond to significantly higher time of arrival (e.g., infinite) and therefore pose little or no perceived threat.

Weighting applied during the threat assessment to any particular input may vary in a nonlinear fashion based on changes in the detected state. For example the threat assessment algorithm may include portions which nonlinearly increase sensitivity when external objects become closer to the vehicle. That is, the algorithm may be highly sensitive to speed and trajectory of movement when an object is within a first distance threshold from the vehicle. In contrast, similar speed and trajectory of movement may have little or no impact to the risk score at distances further away from the vehicle. That is, the algorithm may disregard certain degrees of speed and trajectory of movement when an object is outside of a second distance threshold from the vehicle.

According to further examples, the position of a detected object relative to the vehicle goes into determination of the threat assessment value. That is, objects that are detected at more obscure relative locations relative to a driver's personal FOV may receive a higher threat rating based on a lower likelihood that the driver is aware of the object. In contrast, objects directly in front of the vehicle may receive less threat weighting due to a higher likelihood that the driver is aware of such objects. According to aspects of the present disclosure, the controller is programmed to assign a greater threat weighting in response to detection of external objects that are rear of the vehicle or at oblique rear angles relative to a driver FOV.

The weighting applied to each of the different inputs may be varied relative to each other under certain scenarios. For example, proximity and/or object speed may be receive a higher priority relative to geographical information in some instances. Similarly, time of day may carry a lower priority relative to whether or not the vehicle is at a commerce location.

Based on the degree of the threat detected, the vehicle may undergo any number of response actions depending on the degree and the type of perceived threat. Minor responses may include emitting an audible alert to the driver. In some cases visual alerts are provided such as messages at a display screen, or automatically displaying images depicting the current surroundings of the vehicle. In this way, the source of a detected perceived threat is displayed to inform the user of the threat's presence. Discussed in more detail below, more proactive vehicle responses may include locking doors, closing windows, and/or autonomously driving the vehicle to depart the location of the threat. Further actions may include automatically notifying emergency contacts of a passenger and/or notifying authorities if an interaction with the perceived threat has occurred.

In some examples, the vehicle transmits one or more vehicle-to-X (V2X) signals to an external object to assist in determining or reducing the level of threat. For example if a second vehicle is detected approaching a host vehicle, the host may transmit a vehicle-to-vehicle (V2V) interrogation signal to the approaching vehicle requesting an indication of the approaching vehicle's intent. In the case that the host vehicle is located at an ATM (i.e., a commerce location), a response message from the approaching vehicle indicating its user has routed the approaching vehicle to the same commerce location may reduce the threat level. In another example, the host vehicle may use vehicle-to-device (V2P) communication to interrogate an approaching pedestrian's mobile device for any identifying information which may be indicative of the pedestrian's intent. Such information may also be recalled later to identify a person based on possession of a particular mobile device. The third party mobile device may provide unique identifiers such as a device ID, phone number, MAC Address, serial number, or other uniquely-identifying attribute associated with the device. According to aspects of the present disclosure, a second approaching object having an announced common navigation intent may reduce the likelihood of nefarious intent, and thus reduce the threat assessment value assigned by the host vehicle. According to further aspects, in the event of a high threat level, V2X communications may be used to compile identifying information pertaining to one or more external objects.

Additional vehicle responses may include automatic storage of image data relevant to the source of the perceived threat. The image data may include, for example, still images and/or video streams depicting one or more external objects causing an increase in the threat assessment value. In some examples, a predetermined buffer is used to capture image data for a duration of time preceding the point in time which the threat assessment value exceeds a threshold. Similarly, image data may be captured for a predetermined amount of time following the eclipse of the threat threshold. The captured image data may be stored locally in a memory of the vehicle.

In some examples, image data is automatically transmitted to a remote server. A back office server may be used to remotely administer several different functions of the vehicle, including capturing image data associated with a perceived threat source. Image data uploaded to the server are stored for subsequent retrieval. The remote server may be configured to receive data from any number of vehicles. Thus properties pertaining to the source of the image data are stored to later associate the data with a particular vehicle. Such properties may include, for example, unique keywords, vehicle group identifiers, time stamp information, GPS position, and uniquely-identifying numbers associated with the host vehicle are uploaded to the remote server along with the image data. The image data is archived at the remote server for users to retrieve the data at a later time. In some examples, there may be a time expiration applied to image data, after which the data is purged. In other cases each host vehicle user may be allocated a predetermined maximum amount of data storage available to archive such image data.

The security enhancement may also include transmitting a request from the host vehicle to cause image data capture by third party external objects that have a FOV including at least one of the host vehicle and the source of the perceived threat. The controller may be further programmed to transmit a record request to a remote object having a FOV including the host vehicle. The remote object may be an infrastructure device such as a nearby stationary surveillance camera. The remote object may alternatively be one or more nearby vehicles equipped with image capture devices having FOV's including host vehicle. The remote object may also be a camera-equipped mobile device possessed by a nearby person. The person carrying the mobile device may receive a message or prompt to aim the camera-equipped device to capture image data of the events occurring at host vehicle. Any of the remote objects may in turn receive instructions or a link to upload the recorded image data to a server in similar fashion to the host vehicle uploads discussed above. And, the uploaded image data may be assigned a unique identifier associated with the source of the image, as well as associated with the host vehicle which is the subject of the image.

In further examples the host vehicle may emit a distress beacon in response to the threat assessment value exceeding one or more thresholds. Nearby external objects within range of the distress beacon may receive notification of the perceived threat (or actual encounter) so that nearby users may contact authorities or take other appropriate actions. The beacon may include any number of messages indicative of the nature and urgency of the detected threat.

Figure 2:
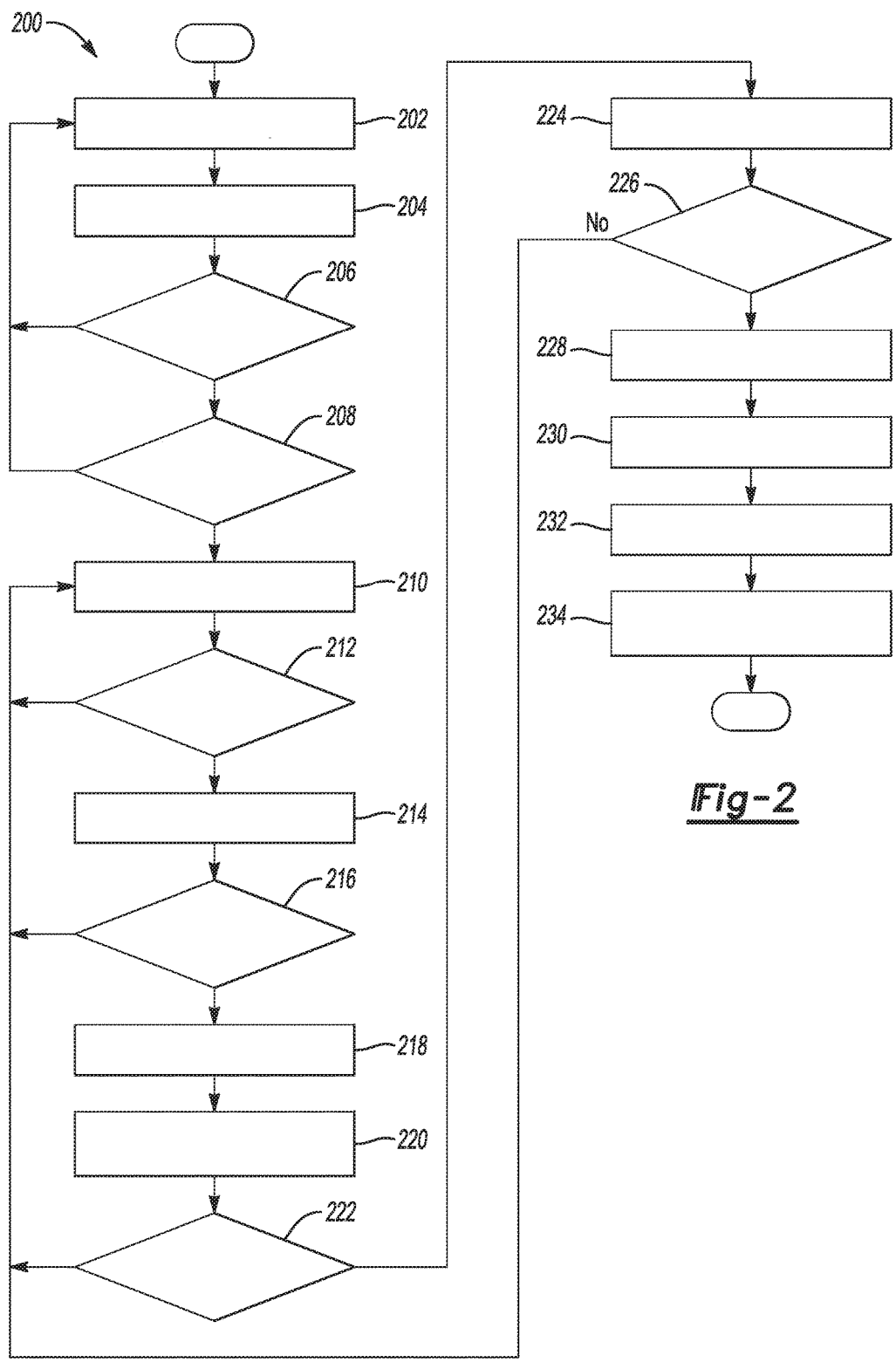
FIG. 2 is a flowchart of a vehicle security enhancement algorithm.

Referring to FIG. 2, flowchart 200 depicts an example algorithm of operation of a threat detection system. At step 202, the algorithm includes receiving user input such as the selection of a diligence mode. As discussed above a user may manually increase the sensitivity of the threat detection when they subjectively feel uncomfortable in light of external vehicle conditions.

At step 204 the algorithm includes receiving location information of the vehicle. The present location of the vehicle may be determined from a number of available sources. The algorithm may include compiling multiple location indicators from different sources. In an example, a vehicle controller stores location information from at least one of a GPS module, a vehicle telecommunications module, a user mobile device, a local Wi-Fi network (e.g., an SSID of a WLAN transmission), as well as other connected vehicle data sources. Compilation of the multiple sources of location data may operate to provide a specific combination of location data which serves as a location signature. The actual location of the vehicle may in turn be used as an input to the threat assessment algorithm.

At 206 the algorithm includes assessing whether the key is present in the vehicle. If the key is not present at the vehicle, it is assumed the driver has departed the vehicle and there is reduce need for vehicle surveillance. In this case the algorithm may return to step 202 and monitor for user input.

In certain alternative embodiments discussed more below, a diligence mode may be engaged when no occupants are present at the vehicle. Surveillance conducted during this state may prevent or discourage theft and/or vandalism.

At step 208 the algorithm includes assessing whether the vehicle is in a static state, such as when the transmission is in park or neutral. If the vehicle is in a motive state at step 208 the algorithm may include returning to step 202 to monitor for user input. In certain alternate embodiments, a vehicle speed V less than a predetermined threshold V1 may still provide an affirmative response at step 208 allowing diligence mode to be engaged at low vehicle speeds. In a specific example, active surveillance may be engaged while the vehicle is motive at a slow creep velocity.

At step 210 the diligence mode is engaged, and sensor detection is enabled. As discussed above, a number of different sensor types may output data which is combined to provide a comprehensive description of the vehicle surroundings. Data is compiled at a vehicle controller for processing and subsequent reporting to a user. As discussed above, processing may be performed by an offline computing source such as a back office server. Results may then be transmitted back to the vehicle for reporting to a user. In the case of offline processing, data from multiple external sensors, such as from nearby vehicles, may be compiled, analyzed, and reported by to the host vehicle.

At step 212 the algorithm includes assessing whether an object has been detected by the active sensors. If no object has been detected at step 212 the algorithm includes returning to step 210 to monitor sensor output data.

At step 212 if an object is detected, the algorithm includes generating a graphic display at step 214. For example, views of a rear camera and multiple lateral cameras are rendered to allow the driver perceive the vehicle external environment. In other examples, lidar and/or radar sensor data is fused to provide a graphical overlay at the user interface display. For example, graphic icons or distance indicators are displayed along with camera images to provide a user with an enhanced display to easily identify potential threats in the vehicle vicinity. The graphic icons may also include information indicative of the movement speed, acceleration, or trajectory of a detected object. Thus the algorithm may be configured to automatically detect aggressive movement of external objects and warn the driver for advanced protection. According to some specific examples, if an acceleration of a detected object is greater than an acceleration threshold, a threat flag may be triggered to provide notification to one or more vehicle passengers.

At 216 the algorithm may include determining whether the current vehicle location is at a high crime risk location. As discussed above, statistical crime data may be used to determine weighting factors to increase or reduce threat levels based on the location of the vehicle. For example, commerce locations may receive a higher threat assessment rating due to the potential exposure of user finances.

At step 218, the host vehicle may attempt communication with a detected external object to exchange data which may affect the threat assessment. For example, the communication may include transmission of an interrogation request to obtain identifying information associated with the detected external object. As discussed above, such communications may include at least one of V2V, V2P, and V2I types of communication.

At step 220 the algorithm includes generating a threat assessment value as an objective measurement of the vicinity of the vehicle. As discussed above, the threat assessment may include inputs from at least one of a plurality of sensor outputs, the type of detected objects, the behavior and intent of a detected object, the host vehicle location, time of day, external light levels, and user inputs.

At step 222 the algorithm includes determining whether the threat assessment exceeds a threshold such that the user should be notified of an object in the vicinity of the vehicle. If the threat assessment value is less than a first Threshold 1 at step 222, the algorithm includes returning to step 210 to continue to monitor sensor inputs without providing an express warning to a vehicle occupant. On the other hand, if the threat assessment is greater than Threshold 1 at step 222, the algorithm includes generating a driver alert at step 224. As discussed above the alert may include any type of notification to the driver that an external object has been perceived as a threat. Such alerts may include, for example, audible tones or messages, haptic notifications, visible messages and displays—including overlays on an image display highlighting one or more particular objects and/or a degree of threat.

At step 226 the algorithm includes determining whether the detected object has caused a heighted threat level to warrant further vehicle responses. If at step 226 the threat assessment value is less than a second Threshold 2, the algorithm includes returning to step 210 to continue to monitor sensor inputs without taking additional vehicle actions. On the other hand, if the threat assessment is greater than Threshold 2 at step 226 the algorithm includes causing more impactful vehicle responses. In at least one example, the algorithm includes storing one or more images by initiating a local recording at step 228. As discussed above image data may be stored in a non-transient memory accessible by the controller.

In other examples, image data may be uploaded to an off-board processor at step 230 for remote storage. In further examples, the algorithm may include transmitting a distress beacon to nearby external objects, or to a predetermined recipient, such as local authorities.

In additional further examples, the algorithm includes causing an active vehicle response at step 234. As described above, the active vehicle response may include generating external audible sounds, closing vehicle windows, locking doors, and/or autonomously departing the location of the threat. In some cases the active vehicle response is performed prior to the arrival of a detected external object at the host vehicle.

Referring to FIG. 3, an example user interface display 300 depicts several FOV's indicative of the vicinity of the vehicle. A display screen may be segmented into any number of views according to the relevant data to be presented to a user. In some examples a single view is provided for simplicity having only a view depicting a detected external object. In the example of FIG. 3, five segments are provided according to five different FOV's from the vehicle located at a fuel station commerce location. View 302 corresponds to image data output from a front camera, view 304 corresponds to image data output from a rear camera, and views 306 and 308 correspond to image data output from left side and right side cameras, respectively. View 310 is a compiled view using data from other cameras to provide a "bird's eye" 360 degree top perspective of the vicinity in a single view. The host vehicle is schematically represented by a vehicle graphic 312.

External objects detected in one or more FOV's may be highlighted by graphical overlays to alert a user to the presence of a potential threat. With continued reference to FIG. 3, several objects are detected by a vehicle vision system and are represented on the graphic user interface 300.

An external object, adjacent vehicle 314, is detected by at least one right side lateral sensor and appears in both of the right side view 308 and the top perspective view 310. According to an aspect of the present disclosure, the vehicle performs a threat assessment of the adjacent vehicle 314 based on one or more inputs as discussed above. In the case of FIG. 3, the object is detected and graphically identified by an overlay of bounding box 316. The graphical overlay bounding box 316 may have visually distinguishing characteristics, such as color or shape for example, to identify it as a non-threatening external object. In one example, the host vehicle communicates an information request to the adjacent vehicle 314 as it enters the vicinity. The adjacent vehicle may respond with a message that it carries a predetermined navigation designation to the same fuel station. Such a predetermined destination, along with the absence of certain aggressive movements may reduce the threat assessment value assigned to the adjacent vehicle 314.

In second example depicted in FIG. 3, a rear-approaching vehicle 318 is detected by at least one rear sensor and appears in both of the rear view 304 and the top perspective view 310. The vehicle performs a threat assessment of the rear-approaching vehicle 318 based on one or more inputs as discussed above. A graphical overlay bounding box 320 is applied to each of the relevant views of the user interface display to identify the rear-approaching vehicle 318. In this case, the host vehicle identifies the rear-approaching vehicle 318 as a threat having a sufficiently large threat assessment value. One example cause is a closing velocity of the rear-approaching vehicle 318 which is greater than an approaching velocity threshold. The bounding box 320 is visually distinctive relative to other graphics identifying non-threat external objects. Also, one or more warning icons 322 may be flashed on the user interface display 300 to alert one or more passengers of the rear-approaching vehicle 318.

In a third example depicted in FIG. 3, an external object pedestrian 324 enters the vicinity of the host vehicle. The pedestrian 324 is detected by at least one left side lateral sensor and appears in both of the left side view 306 and the top perspective view 310. A graphical overlay bounding box 326 is applied to each of the relevant views of the user interface display to identify the pedestrian 324 as a threat. A number of factors may influence the threat assessment value based on the vehicle environment. For example the surveillance algorithm may consider at least one of: being located at a commerce location, the pedestrian 324 approaching from the driver's side of the vehicle, and the pedestrian being at a close proximity distance 328 from the host vehicle. As discussed above, the sensitivity of the threat assessment algorithm may be increased when external objects are detected within a threshold distance from the host vehicle. In this way the vehicle may be more responsive to more subtle behaviors of external objects when they are close by. Similar to the second example immediately above, one or more warning icons 322 may be flashed on the user interface display 300 to alert one or more passengers of the pedestrian 324.

The systems and methods of the present disclosure may also be used to enhance collision avoidance systems. Some examples, may use the vision system to prevent rear-end collisions caused by an aggressively approaching vehicle. V2V communications may be performed between the host vehicle and a rear-approaching vehicle to request information about braking, acceleration, and/or steering of the approaching vehicle. Also, data is acquired from one or more sensors to monitor a distance and a closing velocity of the approaching vehicle. Based on the inferred intent of the approaching vehicle, a threat assessment value is generated to represent a likelihood of impact. Additionally, a representative image may be provided at the user interface display to alert the driver of the oncoming vehicle. Further, vehicle responsive actions may be performed to mitigate or avoid an upcoming impact. In one case the vehicle may autonomously drive forward to reduce impact energy or avoid the impact altogether. The vehicle may consider the upcoming path to steer the vehicle and manage the distance to the approaching vehicle if the host vehicle is limited on how much it can take off. In other cases the vehicle responsive actions may include activating safety features such as restraint belt pretensioning devices and/or airbags in advance of the actual impact. According to aspects of the present disclosure, the vehicle controller is programmed to automatically activate a safety mechanism in response to detection of an imminent impact between the approaching object and the vehicle.

The systems and methods of the present disclosure may further be used to enhance vehicle security even when no user is present in the vehicle. The vehicle controller may initiate diligence mode to protect the vehicle when in a parked state. For example, a vehicle in a parking lot or garage may activate the vision system to deter vandalism and/or theft. Based on performing a threat assessment using sensor data indicative of a detected external object, one or more vehicle responsive actions may be performed to enhance vehicle security. In some examples, when no passengers are present a security alarm trigger may prompt activation of the vision system to enhance the security system. Any combination of the above vehicle response actions may be performed in response to a security alarm, including user notification. A break in alarm may cause recording of image data depicting the vicinity of the vehicle. In other examples, the host vehicle is configured to transmit a distress beacon to nearby image capture devices having a FOV of the host vehicle. Any nearby devices with a view of the vehicle and/or its vicinity may begin to store image data. Therefore a visual of a perpetrating individual departing the vicinity of the vehicle may be captured by multiple devices to enhance a potential identification. In this way a series of vehicles in a parking location may cooperate as surveillance network and provide a greater scale of security by combining image capture capabilities.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writeable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. The processes, methods, and algorithms described above may be repeated at periodic or aperiodic intervals and examples provided in the present disclosure are not limited in the frequency under which the processes are executed While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    at least one imaging device configured to generate image data indicative of a vicinity of the vehicle;
    a user interface display configured to display image data from the at least one imaging device; and
    a controller programmed to:
        monitor image data for the presence of a moving external object within the vicinity;
        activate the user interface display to display image data in response to detecting the moving external object in the vicinity while the vehicle is at a rest condition;
        assess whether a vehicle key is present in the vehicle;
        when the vehicle key is present, assign a threat assessment value based on conditions in the vicinity of the vehicle, and when the vehicle key is not present, monitor for a user input;
        communicate with the moving external object, including transmitting a signal requesting identifying information about the moving external object, in response to the threat assessment value being greater than a first threshold;
        upload image data to an off-board server in response to the threat assessment value being greater than the first threshold; and
        issue a command to autonomously drive away from the moving external object in response to the threat assessment value being greater than a second threshold.

2. The vehicle of claim 1 wherein the conditions in the vicinity of the vehicle include at least one of a geographic location, a traffic density, a determination of a commerce location, time of day, and crime statistical data.

3. The vehicle of claim 1 wherein the controller is further programmed to generate an external warning in response to the threat assessment value being greater than a third threshold.

4. The vehicle of claim 1 wherein the controller is further programmed to adaptively adjust a video recording frame rate based on an intensity of motion within a field of view of the imaging device.

5. The vehicle of claim 1 wherein the controller is further programmed to issue a first warning message in response to the threat assessment value being greater than the first threshold, and issue a second warning message in response the threat assessment value being greater than a second threshold, the second warning message having a greater severity than the first warning message.

6. The vehicle of claim 1 wherein the threat assessment value is further based on a detected aggressive movement of the moving external object, the aggressive movement comprising at least one of an object speed and an object acceleration that is greater than a predetermined movement threshold.

7. The vehicle of claim 1 wherein the controller is further programmed to activate a vehicle security response comprising at least one of: automatically locking at least one closure panel, transmitting a distress message to an off-board server, transmitting an alert to authorities, and transmitting a distress message to other nearby external objects.

8. A method of surveilling a vicinity of a host vehicle having at least one sensor and a controller, the method comprising:
    receiving location-based threat information indicative of a threat risk;
    activating the at least one sensor to monitor a vicinity of the host vehicle while the vehicle is at a rest condition;
    assessing whether a vehicle key is present in the vehicle;
    when the vehicle key is present, assigning a threat assessment value based on a current location of the host vehicle relative to the location-based threat information and a condition of the vicinity, the threat assessment value being based on detection by the at least one sensor of least one of a rate of approaching speed of an approaching object, and a distance between the host vehicle and the approaching object, via the controller;
    when the vehicle key is not present, monitoring for a user input;
    communicating with the approaching object, including transmitting a signal requesting identifying information about the approaching object, in response to the threat assessment value being greater than a first threshold, via the controller;
    issuing a command to autonomously drive away from the approaching object in response to the threat assessment value being greater than a second threshold, via the controller.

9. The method of claim 8 wherein the location-based threat information includes geographic statistical crime data.

10. The method of claim 8 wherein the threat assessment value is further based on assessing whether the current location of the vehicle is at a commerce location.

11. The method of claim 8, further comprising:
    transmitting a video capture request to an external object having a field of view of the host vehicle.

12. The method of claim 8, further comprising:
    generating an external warning in response to the threat assessment value being greater than a third threshold, via the controller.

13. A vehicle comprising:
    at least one sensor configured to monitor a condition of a vicinity of the vehicle;
    a user interface display configured to display image data depicting output from the at least one sensor; and a controller programmed to:
- in response to receiving sensor data indicative of an approaching object while the host vehicle is at a rest condition, display an image depicting the vicinity;
- assess whether a vehicle key is present in the vehicle;
- when the vehicle key is present, assign a threat assessment value based on at least one of a rate of approaching speed of the approaching object, and a distance between the vehicle and the approaching object;
- when the vehicle key is not present, monitor for a user input;
- communicate with the approaching object, including transmitting a signal requesting identifying information about the approaching object, in response to the threat assessment value being greater than a first threshold; and
- issue a command to autonomously drive away from the approaching object, in response to the threat assessment value being greater than a second threshold.

14. The vehicle of claim 13 wherein the controller is further programmed to automatically activate a safety mechanism in response to detection of an imminent impact between the approaching object and the vehicle.

15. The vehicle of claim 13 wherein the controller is further programmed to transmit an image capture request to an external object having a field of view of the vehicle.

16. The vehicle of claim 13, wherein the controller is further programmed to generate an external warning in response to the threat assessment value being greater than a third threshold.

* * * * *